(12) United States Patent
Kim (10) Patent No.: US 9,557,897 B2
(45) Date of Patent: Jan. 31, 2017

(54) APPARATUS AND METHOD FOR INPUTTING CUTTING SHAPE USING INTERACTIVE PROGRAM IN COMPUTER NUMERICAL CONTROL MACHINE TOOL

(75) Inventor: Dong Hwan Kim, Gyeonggi-do (KR)

(73) Assignee: Doosan Machine Tools Co., Ltd., Gyeongsangnam-do (KR)

(*) Notice: Subject to any disclaimer, the term of this patent is extended or adjusted under 35 U.S.C. 154(b) by 154 days.

(21) Appl. No.: 13/981,484

(22) PCT Filed: Nov. 23, 2011

(86) PCT No.: PCT/KR2011/008961
§ 371 (c)(1),
(2), (4) Date: Jul. 24, 2013

(87) PCT Pub. No.: WO2012/102472
PCT Pub. Date: Aug. 2, 2012

(65) Prior Publication Data
US 2013/0311950 A1 Nov. 21, 2013

(30) Foreign Application Priority Data
Jan. 24, 2011 (KR) .................. 10-2011-0006732

(51) Int. Cl.
*G06F 17/00* (2006.01)
*G06F 3/0484* (2013.01)
*G05B 19/4093* (2006.01)

(52) U.S. Cl.
CPC ....... *G06F 3/0484* (2013.01); *G05B 19/40935* (2013.01); *Y02P 90/265* (2015.11)

(58) Field of Classification Search
CPC G06F 17/50; G06F 17/30259; G06F 2217/02; G06F 17/5086; G06F 17/5077; G06F 17/5018; G06F 2217/16
See application file for complete search history.

(56) References Cited

U.S. PATENT DOCUMENTS 5,388,199 A * 2/1995 Kakazu ............ G05B 19/4097
345/420
5,757,649 A * 5/1998 Kato .................. G05B 19/4097
700/182

(Continued)

FOREIGN PATENT DOCUMENTS

CN 1816783 A 8/2006
CN 101334657 A 12/2008

(Continued)

OTHER PUBLICATIONS

Hoffmann et al.; On User-Defined Features; Department of Computer Sciences Purdue University; Aug. 20, 1997; 30 pages.*

(Continued)

*Primary Examiner* — Linh K Pham
(74) *Attorney, Agent, or Firm* — John D. Veldhuis-Kroeze; Westman, Champlin & Koehler, P.A.

(57) ABSTRACT

The present disclosure relates to an apparatus and a method for inputting a processing shape using an interactive program in a computer numerical control machine tool, including: an input unit having a key for inputting a parameter of an inputted shape; a display unit which registers a shape processed by a user as a user registration shape and provides a user interface environment capable of editing the registered user registration shape; a memory unit which stores a plurality of user registration shapes; an interactive program control unit which displays the plurality of user registration shapes stored in the memory unit through the display unit when the user requests the user registration shape, and outputs shape information after the user selects a representative shape from the plurality of user registration shapes and inputs a parameter of the representative shape; and a programmable machine controller (PMC) unit which drives (Continued)

the machine tool on the basis of the shape information outputted from the interactive program control unit.

17 Claims, 7 Drawing Sheets

(56) References Cited

U.S. PATENT DOCUMENTS

| | | | |
|---|---|---|---|
| 5,940,292 A | 8/1999 | Kurakake et al. | |
| 2003/0078758 A1* | 4/2003 | Hariya | G06F 17/5018 703/2 |
| 2003/0139831 A1* | 7/2003 | Takeda | G05B 19/41885 700/97 |
| 2006/0038829 A1* | 2/2006 | Morichi | G05B 19/4097 345/619 |
| 2006/0058908 A1* | 3/2006 | Kamiya | G05B 19/4093 700/186 |
| 2006/0259181 A1* | 11/2006 | Kamiya | G05B 19/4093 700/180 |
| 2007/0027571 A1* | 2/2007 | Kamiya | G05B 19/4093 700/182 |
| 2008/0056581 A1* | 3/2008 | Yamaguchi | G06F 17/30259 382/203 |
| 2009/0319237 A1* | 12/2009 | Nishikawa | G06T 19/00 703/1 |
| 2012/0075391 A1* | 3/2012 | Tsai | B41J 2/17553 347/86 |

FOREIGN PATENT DOCUMENTS

| | | |
|---|---|---|
| EP | 1642675 A1 | 4/2006 |
| JP | 09-155645 | 6/1997 |
| JP | 11-045106 | 2/1999 |
| KR | 10-2003-0069657 | 8/2003 |

OTHER PUBLICATIONS

Wang et al., Document-Driven Design for Distributed CAD Services in Service-Oriented Architecture; © 2006; ASME; vol. 6; 12 pages.*

Search Report dated May 31, 2012 and written in Korean with English translation attached for International Patent Application No. PCT/KR2011/008961 filed Nov. 23, 2011, 5 pages.

Chinese Office Action dated Feb. 1, 2016 for Chinese Application No. 201180065869.9, 8 pages.

Hou et al., "Research on Three-Dimensional Parametric Modeling Method of Components and Parts Library", Computer Engineering and Applications, Oct. 11, 2010, 46 (29): 221-224, with English abstract.

* cited by examiner

APPARATUS AND METHOD FOR INPUTTING CUTTING SHAPE USING INTERACTIVE PROGRAM IN COMPUTER NUMERICAL CONTROL MACHINE TOOL

CROSS-REFERENCE TO RELATED APPLICATION

This Application is a Section 371 National Stage Application of International Application No. PCT/KR2011/008961, filed Nov. 23, 2011 and published, not in English, as WO2012/102472 on Aug. 2, 2012.

FIELD OF THE DISCLOSURE

The present disclosure relates to an apparatus and a method for inputting a processing shape using an interactive program in a computer numerical control machine tool, and particularly, to an apparatus and a method which are capable of more easily and conveniently inputting a shape of a work piece to be processed.

BACKGROUND OF THE DISCLOSURE

Recently, a request for an interactive program, which allows a user to conveniently input a shape and a processing condition of a work piece and create a processing program in a work field, is being increased. However, in a method of inputting a shape of the interactive program of the related art, a user defines a shape by sequentially inputting only straight line and circular arc elements that are provided by the interactive program while seeing the drawings. In this method, it is difficult and inconvenient to input a shape. In addition, the user needs to input a shape every time in accordance with contents of work, and in order to reuse contents of past work, the user needs to select the corresponding contents of work or shape information, and performs entire or partial correction thereof.

In some exclusive processing apparatuses, information on frequent contents of work is patterned and provided by a system, but the exclusive processing apparatuses is limited to a restrictive shape for a specific processing or a standardized processing, and is not used for a processing for a turning center (TC). In addition, in order to increase convenience for the user in inputting a shape, some interactive programs provide a function of inputting a shape using a CAD file. However, because this function changes the CAD file made by the user into internal data of the interactive program, reutilization of the existing processed shape information is very low.

In addition, there is a case in which an expert user directly makes a macro program using variables in a memory in a machine tool, but the expert user needs to participate in working for a long period of time, and an environment for convenience of use is not provided.

Meanwhile, for a small quantity batch production, which is gradually increased in an industrial field, it is necessary to frequently input a shape for various products, and to this end, much effort and time are needed with the method of inputting a shape using the existing interactive program. Therefore, in order to increase efficiency of a processing program in a work field, and improve convenience of the user and contents of work, an improvement in a method of inputting a shape in a processing program is acutely required.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

An embodiment of the present disclosure has been presented to solve the aforementioned problem, and has been made in an effort to provide an apparatus and a method for inputting a processing shape using an interactive program in a computer numerical control machine tool, in which a user arbitrarily parameterizes shape information and processing information of work pieces which are repeatedly used in a processing place, registers relevant information in a system, and changes a parameter of the registered shape at the time of processing similar products thereafter, and as a result, efficiency of inputting a processing shape may be improved, and convenience of use may be maximized.

To this end, according to a first aspect of the present disclosure, an apparatus for inputting a processing shape using an interactive program in a computer numerical control machine tool according to the present disclosure, includes: an input unit having a key for inputting a shape, and a parameter of the inputted shape; a display unit which registers a shape processed by a user as a user registration shape and provides a user interface environment capable of editing the registered user registration shape; a memory unit which stores a plurality of user registration shapes; an interactive program control unit which displays the plurality of user registration shapes stored in the memory unit through the display unit when the user requests the user registration shape, and outputs shape information after the user selects a representative shape from the plurality of user registration shapes and inputs a parameter of the representative shape; and a programmable machine controller (PMC) unit which drives the machine tool on the basis of the shape information outputted from the interactive program control unit.

In addition, according to a second aspect of the present disclosure, a method of inputting a processing shape using an interactive program in a computer numerical control machine tool according to the present disclosure, includes: providing a plurality of user registration shapes to a user; receiving a representative shape selected by the user among the plurality of user registration shapes; and receiving a parameter of the representative shape inputted by the user.

As described above, according to an apparatus and a method for inputting a processing shape using an interactive program in a computer numerical control machine tool according to the present disclosure, the user arbitrarily parameterizes shape information and processing information of work pieces which are repeatedly used in a processing place, registers relevant information in the system, and changes the parameter of the registered shape at the time of processing similar products thereafter, and as a result, there are effects in that efficiency of inputting a processing shape may be improved, and convenience of use may be maximized.

DESCRIPTION OF MAIN REFERENCE NUMERALS OF DRAWINGS

510: Processor
520: Input unit
530: Display unit
540: Memory unit
550: Machine tool
560: Interactive program control unit
570: PMC unit

DETAILED DESCRIPTION

As a meaning of dictionary, an interactive program mentioned in the present disclosure refers to a program which processes data by directly receiving data from a user, and means a program capable of performing an interaction with the user by allowing the user to directly participate in inputting and processing data.

In an embodiment of the present disclosure, the user may register an arbitrary shape in an interactive program as a user registration shape, and may store a shape being processed or having been processed presently or a shape processed in the past in the interactive program as the user registration shape as necessary without other separate programming procedures.

Hereinafter, an apparatus and a method for inputting a processing shape using an interactive program in a computer numerical control machine tool according to an exemplary embodiment of the present disclosure will be described in detail with reference to the accompanying drawings.

Figure 1:
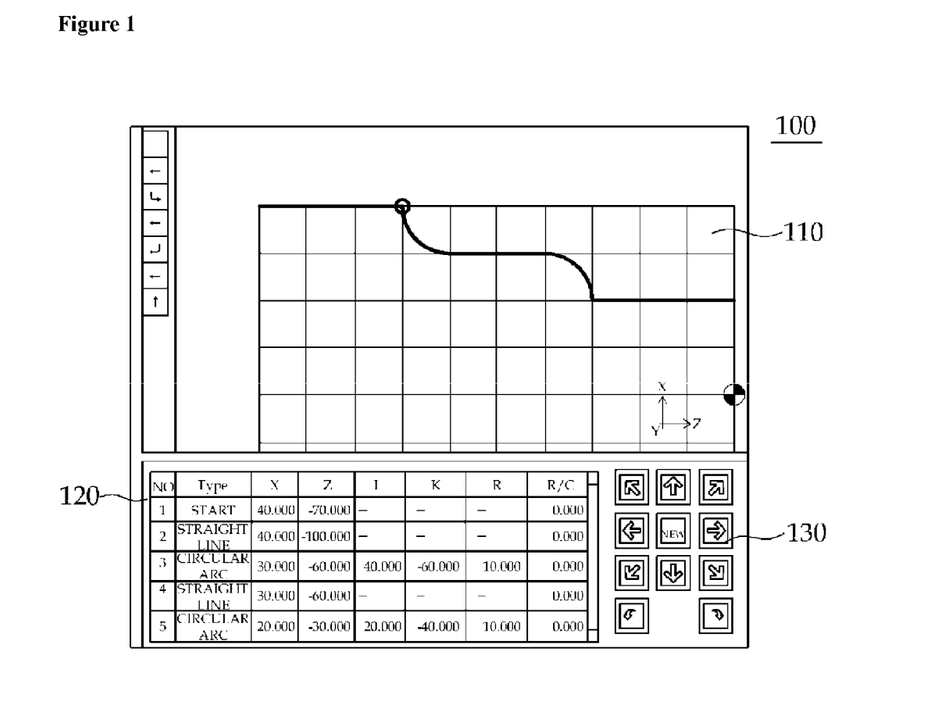
FIG. 1 is a view illustrating a shape input screen using an interactive program according to an exemplary embodiment of the present disclosure.

FIG. 1 is a view illustrating a shape input screen using an interactive program according to an exemplary embodiment of the present disclosure.

Referring to FIG. 1, a shape input screen 100 according to the exemplary embodiment of the present disclosure includes a shape graphic output part 110, a shape information list 120, and a shape element selection part 130.

The shape graphic output part 110 displays a grid shape on the screen in accordance with a size of a work piece, which is inputted by a user, and shows an origin, coordinate axes, a central point of a work piece, and a shape inputted by the user.

The shape information list 120 outputs shape elements such as a start point, a straight line, a circular arc, a round, a chamfer, and the like of the shape inputted by the user, and coordinate information of the respective shape elements, as a list type. Here, each column of the shape information list 120 may be selected by the user. Therefore, the user may easily select the shape element that is being processed, and may correct or delete the selected shape element.

The shape element selection part 130 may select the shape element by designating a corresponding block on a touch screen, and may be implemented to enable a selective input by a manipulation of an input unit (520 in FIG. 5) provided on a manual data input (MDI) panel, that is, a key. Therefore, the user may input the shape elements such as a straight line, a circular arc, a chamfer, and the like using the shape element selection part 130.

Figure 2:
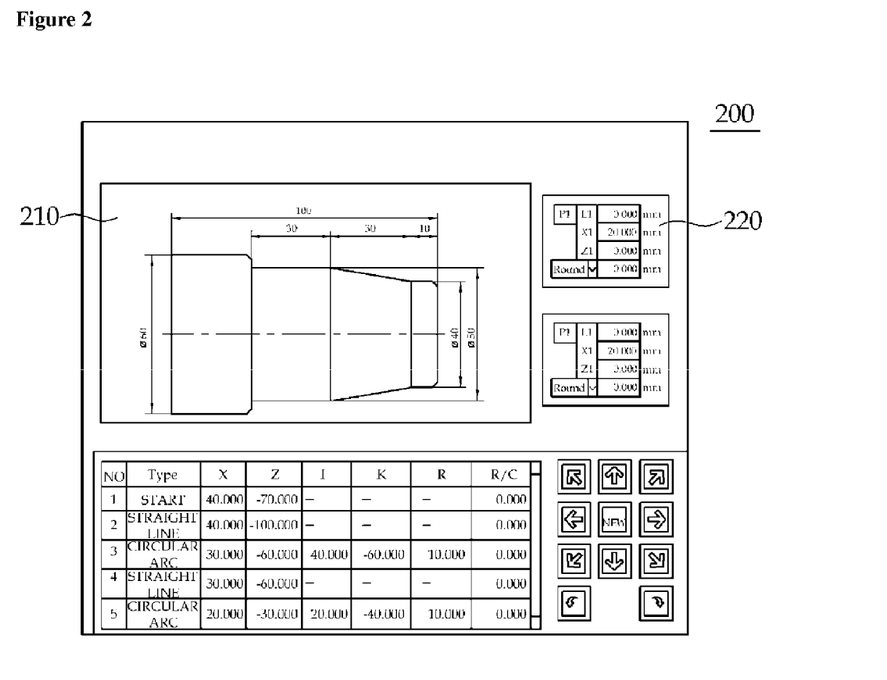
FIG. 2 is a view illustrating a shape registration screen using an interactive program according to the exemplary embodiment of the present disclosure.

FIG. 2 is a view illustrating a shape registration screen using an interactive program according to the exemplary embodiment of the present disclosure.

Referring to FIG. 2, a shape registration screen 200 includes a user registration shape output part 210, and a variable definition part 220.

The user registration shape output part 210 shows shape graphic information processed by the user, together with the shape element that is selected by the user in order to set a parameter.

The variable definition part 220 provides a variable list of the selected shape element, and may receive variables including a length L1 for each position P1, a position coordinate X1 and Z1, an element start point, and an angle between elements of the shape element which is selected by the user through the variable list. Therefore, the user may allocate the shape of which a parameter setting is completed to an internal variable of the interactive program through the variable definition part 220.

After the parameter setting of the shape is completed, the interactive program produces a macro NC code which defines the shape of which a parameter setting is completed as the variable, and stores graphic information, a parameter, and the macro NC code of the shape in an internal memory to register the shape of which the parameter setting is completed in the internal memory as the user registration shape.

Figure 3:
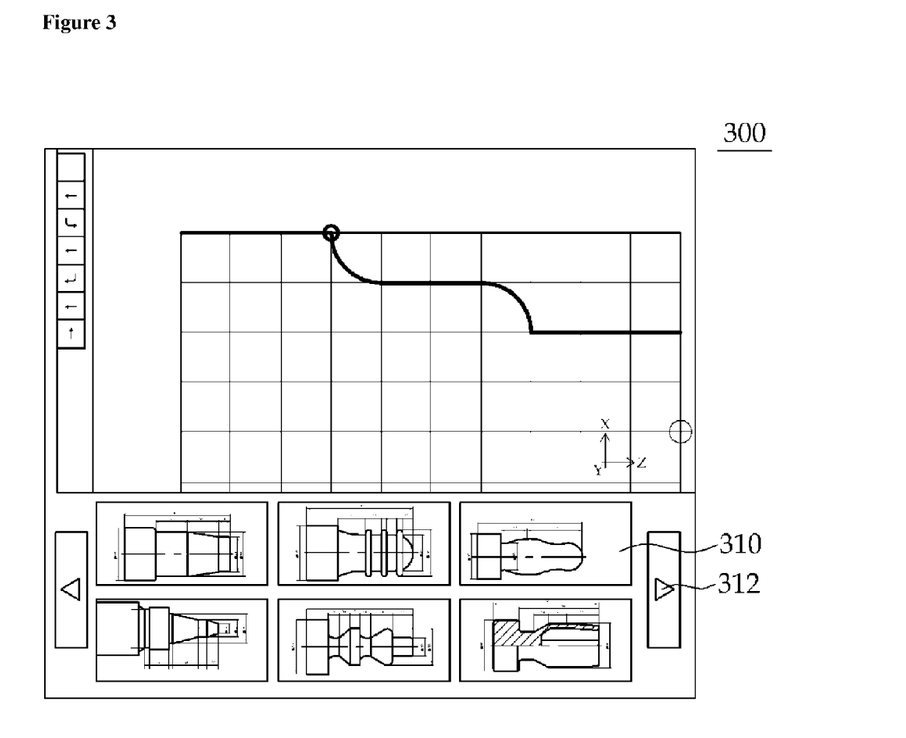
FIG. 3 is a view illustrating a shape selection screen using an interactive program according to the exemplary embodiment of the present disclosure.

FIG. 3 is a view illustrating a shape selection screen using an interactive program according to the exemplary embodiment of the present disclosure.

Referring to FIG. 3, a shape selection screen 300 includes a user registration shape list 310.

The user registration shape list 310 shows a plurality of user registration shapes stored in the interactive program. The user registration shape list 310 may switch the screen by using arrows 312 at the left and right sides in accordance with the number of user registration shapes. Therefore, the user may select a shape, which is similar to a shape to be presently processed among the plurality of user registration shapes through the shape graphic information outputted from the user registration shape list 310.

Figure 4:
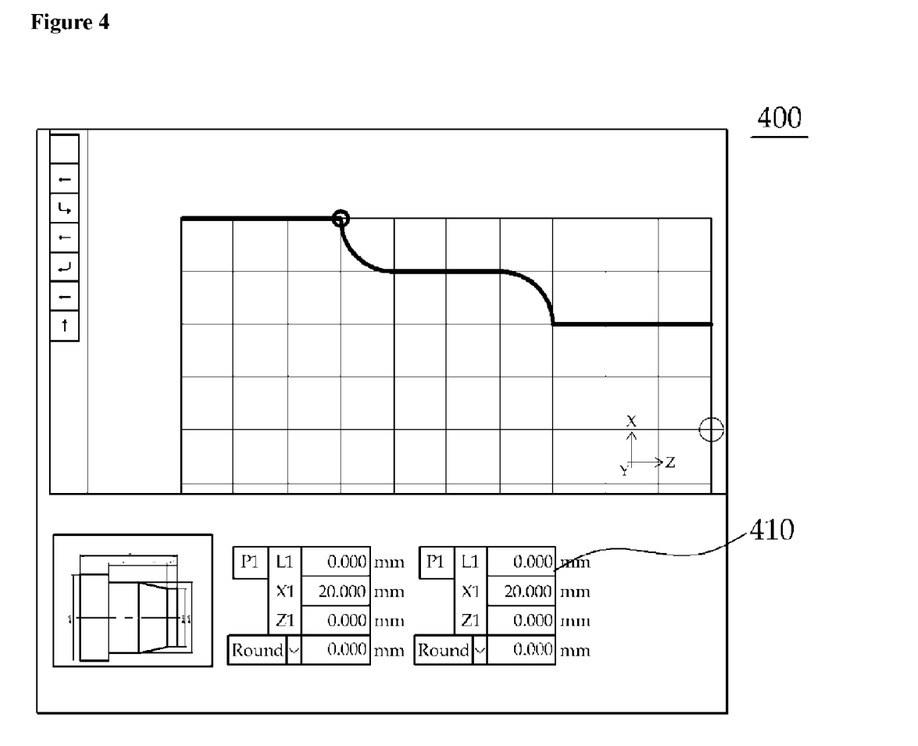
FIG. 4 is a view illustrating a parameter input screen using an interactive program according to the exemplary embodiment of the present disclosure.

FIG. 4 is a view illustrating a parameter input screen for inputting a parameter of the user registration shape after the user registration shape is selected in FIG. 3.

Referring to FIG. 4, the parameter input screen 400 includes a shape parameter input part 410.

The user may input a parameter of the user registration shape through the shape parameter input part 410, and confirm the contents as a graphic in the shape graphic output part 110 to compare the contents with his/her own drawings.

Information that is inputted by the user through the shape parameter input part 410 is also reflected to the shape information list 120 of FIG. 1. In addition, the user may add new shape element as the user registration shape through the shape element selection part 130, and register the new shape element as a new user registration shape.

Figure 5:
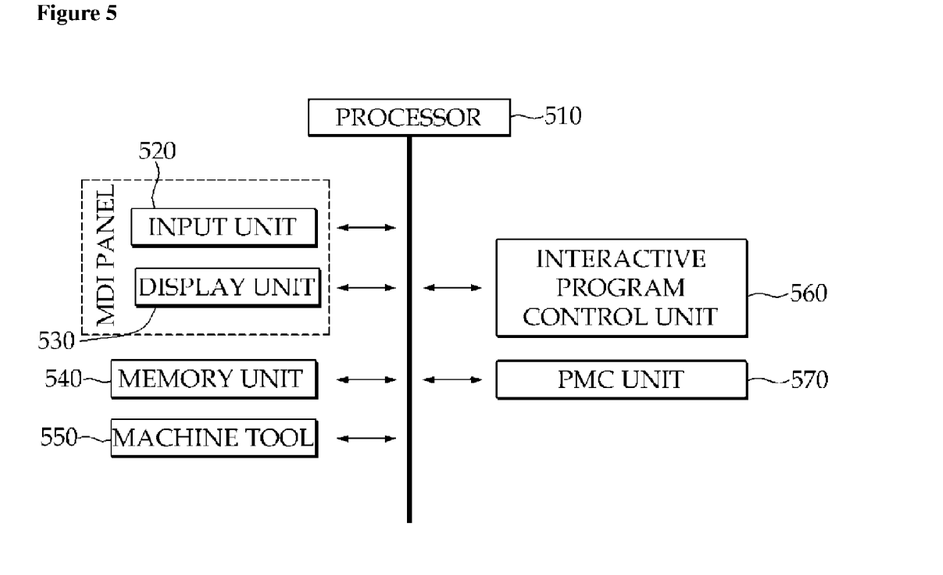
FIG. 5 is a view illustrating a hardware configuration of the apparatus for inputting a processing shape using an interactive program in a computer numerical control machine tool according to the exemplary embodiment of the present disclosure.

FIG. 5 is a view illustrating a hardware configuration of the apparatus for inputting a processing shape using an interactive program in a computer numerical control machine tool according to the exemplary embodiment of the present disclosure.

As illustrated in FIG. 5, the apparatus for inputting a processing shape according to the exemplary embodiment of the present disclosure includes an input unit 520, a display unit 530, a memory unit 540, an interactive program control unit 560, and a PMC (programmable machine controller) unit 570.

Here, the entire operations of the respective constituent elements are controlled by a processor 510 of a system.

The input unit 520, as a means to input a shape, includes a key for selecting a shape element that configures a shape, and inputting a parameter of the selected shape element, and outputs a signal, which is corresponding to the key inputted by the user, to the interactive program control unit 560.

The input unit 520 according to the present disclosure may be provided on an MDI panel, or may be provided on the display unit 530 as a touch screen type.

The display unit 530 provides a shape input screen 100 displaying a process in which a shape is inputted, a shape registration screen 200 displaying a process in which a shape is registered, a shape selection screen 300 displaying a process in which the user registration shape is selected, a parameter input screen 400 displaying a process in which a parameter of the user registration shape is inputted, and the like. That is, the display unit 530 registers a shape processed by the user as the user registration shape, and provides a user interface environment capable of loading and editing the registered user registration shape.

The memory unit 540 stores a control program for controlling the entire operations of the system through the processor 510 and the interactive program which is necessary to drive the machine tool 550.

In addition, the memory unit 540 according to the present disclosure stores the user registration shape registered by the user. In detail, the memory unit 540 stores graphic information, a parameter, and a macro NC code of the shape inputted by the user so as to store the inputted shape as the user registration shape.

In addition, at the time of a user request, the memory unit 540 may provide the stored user registration shape to the user through the display unit 530. Here, the memory unit 540 may provide a parameter corresponding to the user registration shape, together with the user registration shape.

The interactive program control unit 560 generally controls an operation of the machine tool 550, provides a plurality of user registration shapes stored in the memory unit 540 through the display unit 530 when the user requests the user registration shape, and after the user selects a representative shape from the plurality of user registration shapes and inputs a parameter of the selected representative shape, outputs the shape information corresponding to the parameter, and transmits the outputted shape information to the PMC unit 570.

The PMC unit 570 drives the machine tool 550 on the basis of the shape information received from the interactive program control unit 560.

Therefore, the user registers a shape, which has been already processed by the user, in the interactive program as the user registration shape, selects a shape, which is similar to a shape to be presently processed among the plurality of user registration shapes, at the time of performing new processing, and changes only a parameter of the selected user registration shape, and as a result, efficiency of inputting a processing shape may be increased, and convenience of use may be maximized.

Figure 6:
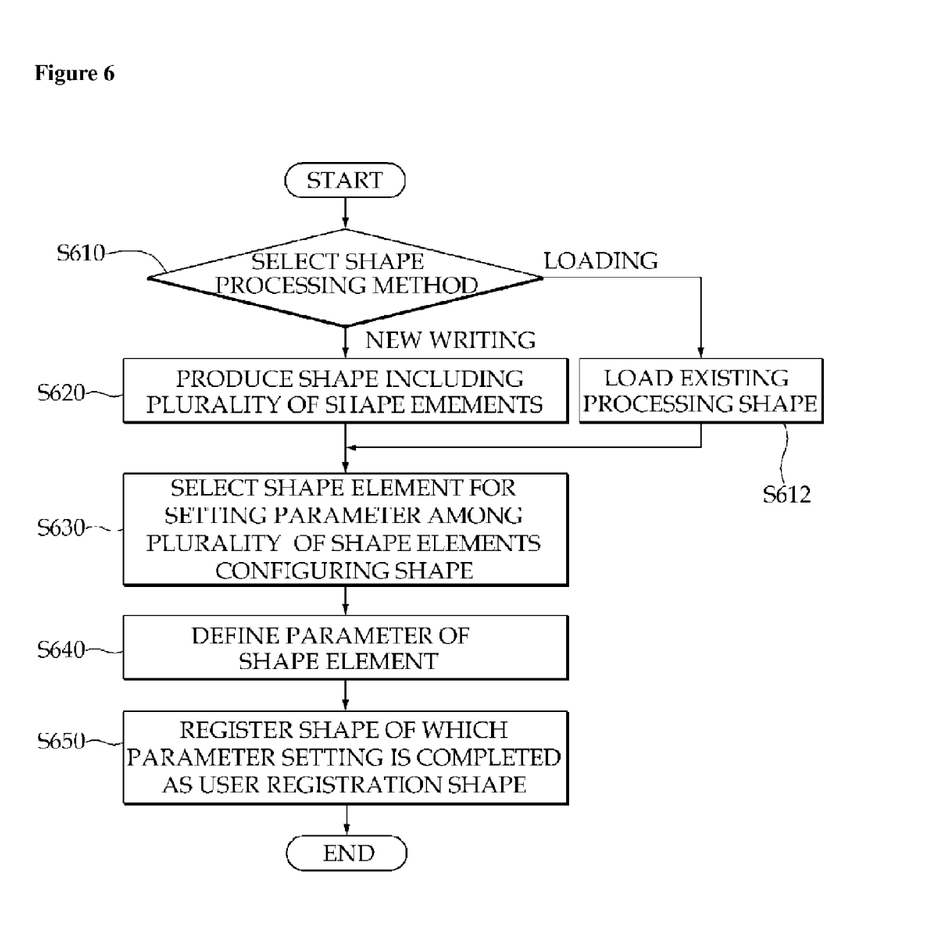
FIG. 6 is a flow chart illustrating a method of registering a user registration shape using an interactive program in a computer numerical control machine tool according to the exemplary embodiment of the present disclosure.

FIG. 6 is a flow chart illustrating a method of registering a user registration shape using an interactive program in a computer numerical control machine tool according to the exemplary embodiment of the present disclosure.

Referring to FIG. 6, a shape processing method among methods of newly writing and loading is selected by the user (S610).

When the user selects new writing, a shape including a plurality of shape elements is produced to be selectively inputted shape elements such as a straight line, a circular arc, a chamfer, and the like by the user (S620).

When the user selects loading, the existing processing shape is loaded (S612). Here, the user may add a shape element to the existing processing shape, and may correct or delete the existing processing shape.

The shape element for setting a parameter among a plurality of shape elements which configures a shape is selected by the user (S630).

The variable list of the selected shape element is provided to the user, and variables including a length L1 for each position P1, position coordinates X1 and Z1, an element start point, and an angle between elements of the selected shape element is inputted by the user through the variable list (S640).

The macro NC code which defines the shape of which a parameter setting is completed as the variable is produced, and graphic information, a parameter, and the macro NC code of the shape are stored in the internal memory so that the shape of which the parameter setting is completed is registered in an internal memory as the user registration shape (S650).

Figure 7:
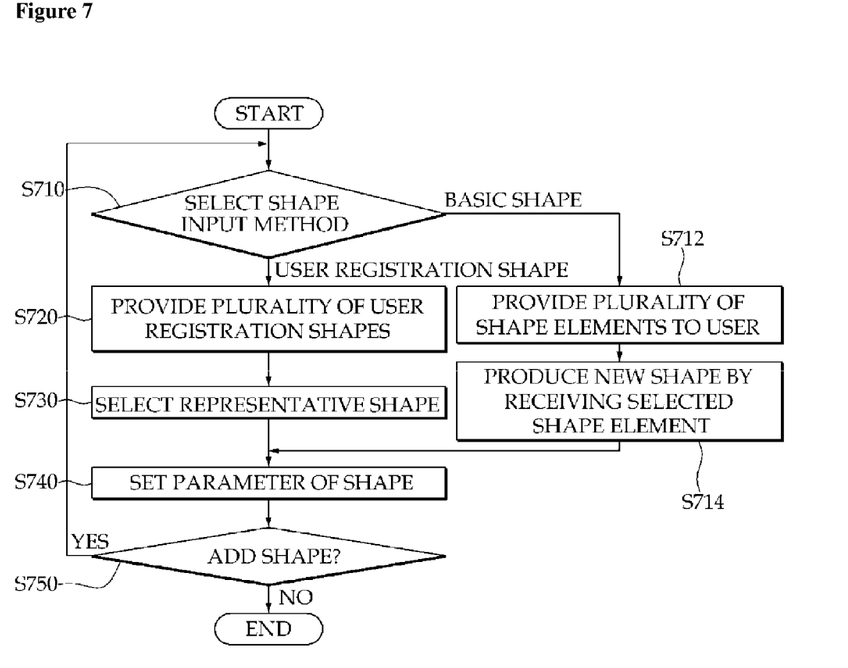
FIG. 7 is a flow chart illustrating a method of inputting a processing shape using an interactive program in a computer numerical control machine tool according to the exemplary embodiment of the present disclosure.

FIG. 7 is a flow chart illustrating a method of inputting a processing shape using an interactive program in a computer numerical control machine tool according to the exemplary embodiment of the present disclosure.

Referring to FIG. 7, a shape input method among a user registration shape and a basic shape is selected by the user (S710).

When the user selects the user registration shape, a plurality of user registration shapes stored in the internal memory is provided to the user (S720).

When the user selects the basic shape, a plurality of shape elements including a straight line, a circular arc, and a chamfer is provided to the user (S712), and a new shape is produced to be selectively inputted the shape element by the user (S714).

A representative shape of the plurality of user registration shapes is selected by the user (S730).

Thereafter, a parameter of the representative shape or new shape is inputted by the user (S740). In detail, the variable list of the representative shape or new shape is provided to the user, and variables including a length L1 for each position P1, position coordinates X1 and Z1, an element start point, and an angle between elements of the representative shape or new shape is inputted by the user through the variable list.

Additionally, it is determined whether the user additionally inputs a shape (S750), when the user adds a shape, step S710 to step S740 are repeatedly performed after returning back to step S710, and when the user does not add the shape, a process of inputting a processing shape ends.

As described above, specific embodiments of the present disclosure have been described. However, the spirit and scope of the present disclosure are not limited to the specific embodiments, and it will be understood by those skilled in the art that various modifications and changes may be made without departing from the scope of the subject matter of the present disclosure.

Therefore, the aforementioned embodiments are provided to completely inform the scope of the present disclosure to those skilled in the art, the described embodiments should be considered in all respects as illustrative only and not restrictive, and the present disclosure is defined only by the scope of the appended claims.

According to an apparatus and a method for inputting a processing shape using an interactive program in a computer numerical control machine tool according to the present disclosure, the user arbitrarily parameterizes shape information and processing information of work pieces which are repeatedly used in a processing place, registers relevant information in the system, and changes the parameter of the registered shape at the time of processing similar products thereafter, and as a result, efficiency of inputting a processing shape may be improved, and convenience of use may be maximized, accordingly, as the present disclosure exceeds the limitation of the existing technology, the present disclosure is not used only for the relevant technology, bus has sufficient commercial availability or sufficient possibility of business of the apparatus to which the present disclosure is applied, and as a result, the present disclosure may be actually and apparently implemented, and thus has industrial applicability.

Although the present disclosure has been described with reference to exemplary and preferred embodiments, workers skilled in the art will recognize that changes may be made in form and detail without departing from the spirit and scope of the disclosure.

The invention claimed is:

1. An apparatus for inputting a processing shape using an interactive program in a computer numerical control machine tool, comprising:
    an input unit having a key which is configured to provide for inputting a shape and a parameter of the inputted shape;
    a display unit which is configured to:
    provide for registering a shape processed by a user as a user registration shape; and
    provide a user interface environment configured to edit the registered user registration shape;
    a memory unit which is configured to store a plurality of user registration shapes;
    an interactive program controller which is configured to:
    display the plurality of user registration shapes stored in the memory unit through the display unit when the user requests the user registration shape; and
    output shape information after the user selects a representative shape from the plurality of user registration shapes and inputs a parameter of the representative shape; and
    a programmable machine controller (PMC) which is configured to drive the machine tool on the basis of the shape information outputted from the interactive program controller,
    wherein the user interface environment includes a shape registration screen, a user registration shape output part, and a variable definition part,
    wherein the variable definition part is configured to:
    provide a variable list of the selected shape element; and
    receive variables including a length for each position, a position coordinate, an element start point, and an angle between elements of the shape which is selected by the user through the variable list,
    wherein the display unit is configured to provide a shape input screen displaying a process in which a shape is inputted,
    wherein the shape input screen includes a shape graphic output part, a shape information list, and a shape element selection part,
    wherein the shape graphic output part is configured to display a grid shape on the shape input screen in accordance with a size of a work piece, and
    wherein, the display unit is further configured to provide a shape registration screen displaying a process in which a shape is registered, a shape selection screen displaying a process in which the user registration shape is selected, and a parameter input screen displaying a process in which a parameter of the user registration shape is inputted.

2. The apparatus of claim 1, wherein the memory unit is configured to store graphic information, a parameter, and a macro NC code of the shape inputted by the user to store the inputted shape as the user registration shape.

3. The apparatus of claim 1, wherein an interactive program produces a macro NC (machine controller) code which defines the shape of which a parameter setting is completed as the variable, and an interactive program stores graphic information, a parameter, and the macro NC (machine controller) code of the shape in a memory to register the shape of which the parameter setting is completed in the memory as the user registration shape.

4. The apparatus of claim 1, wherein the size of the work piece is inputted by the user, and wherein the shape graphic output part is configured to display an origin, coordinate axes, a central point of the work piece, and a shape inputted by the user.

5. The apparatus of claim 1, wherein the shape information list is configured to:
    display shape elements including a start point, a straight line, a circular arc, a round, and a chamfer of the shape inputted by the user; and
    arrange information of the shape elements, as a manipulable list.

6. The apparatus of claim 5, wherein the manipulable list includes a multi-dimensional list.

7. The apparatus of claim 6, wherein the manipulable list includes multiple columns for representing multiple types of coordinate information for each shape element of the manipulable list, and each column of the shape information list is configured to be selectable by the user, such that the user can select a specific parameter of a shape element, and change or delete the selected parameter.

8. The apparatus of claim 1, wherein the shape element selection part is configured to be user selectable such that a user can select a shape element by designating a corresponding block on a touch screen.

9. A method of inputting a processing shape using an interactive program in a computer numerical control machine tool, comprising:
    providing, by an input unit having a key, for inputting a shape and a parameter of the inputted shape;

providing, by a display unit, for registering the shape processed by a user as a user registration shape;

storing a plurality of user registration shapes in a memory unit;

providing, by an interactive program controller, the plurality of user registration shapes stored in the memory unit via the display unit to a user when the user requests a user registration shape;

outputting, by an interactive program controller, shape information after the user selects a representative shape among the plurality of user registration shapes and inputs a parameter of the representative shape;

providing, by the display unit, a user interface environment configured to provide editing of the representative shape, wherein the user interface environment includes a shape registration screen displaying a process in which a shape is registered, a user registration shape output part, a variable definition part;

driving, by a programmable machine controller (PMC), the machine tool on the basis of the shape information;

providing, by the display unit, a shape input screen displaying a process in which a shape is inputted, a shape selection screen displaying a process in which the user registration shape is selected, and a parameter input screen displaying a process in which a parameter of the user registration shape is inputted, wherein the shape input screen includes a shape graphic output part, a shape information list, and a shape element selection part, and wherein the variable definition part provides a variable list of the selected shape element, and receives variables including a length for each position, a position coordinate, an element start point, and an angle between elements of the shape element which is selected by the user through the variable list; and displaying, by the shape graphic output part, a grid shape on the shape input screen in accordance with a size of a work piece.

10. The method of claim 9, further comprising:

producing a shape including a plurality of shape elements by receiving any one of shape elements of a straight line, a circular arc, and a chamfer inputted by the user;

receiving a shape element for setting a parameter selected by the user among a plurality of shape elements which configures the produced shape;

receiving a parameter of the shape element selected by the user; and registering the shape of which the parameter setting is completed as the user registration shape.

11. The method of claim 10, wherein the shape elements include a start point, a straight line, a circular arc, a round, and a chamfer of the shape inputted by the user, and wherein the shape information list further displays coordinate information of the shape elements as a manipulable list.

12. The method of claim 11, wherein the manipulable list includes multiple columns for representing multiple types of coordinate information for each shape element of the manipulable list, and each column of the shape information list is selectable by the user, such that the user can select a specific parameter of a shape element, and change or delete the selected parameter.

13. The method of claim 9, further comprising: determining whether the user additionally inputs a shape.

14. The method of claim 9, wherein an interactive program produces a macro NC (machine controller) code which defines the shape of which a parameter setting is completed as the variable, and an interactive program stores graphic information, a parameter, and the macro NC (machine controller) code of the shape in a memory to register the shape of which the parameter setting is completed in the memory as the user registration shape.

15. The method of claim 9, wherein the size of a work piece is inputted by the user; and wherein the method further comprises displaying, by the shape graphic output part, an origin, coordinate axes, a central point of the work piece, and a shape inputted by the user.

16. The method of claim 9, wherein the shape element selection part is user selectable to select a shape element by designating a corresponding block on a touch screen.

17. An apparatus for inputting a processing shape using an interactive program in a computer numerical control machine tool, comprising:

an input unit having a key which is configured to provide for inputting a shape and a parameter of the inputted shape;

a display unit which is configured to:

provide for registering a shape processed by a user as a user registration shape; and provide a user interface environment configured to edit the registered user registration shape;

a memory unit which is configured to store a plurality of user registration shapes;

an interactive program controller which is configured to:

display the plurality of user registration shapes stored in the memory unit through the display unit when the user requests the user registration shape; and output shape information after the user selects a representative shape from the plurality of user registration shapes and inputs a parameter of the representative shape; and a programmable machine controller (PMC) which is configured to drive the machine tool on the basis of the shape information outputted from the interactive program controller, wherein the user interface environment includes a shape registration screen, a user registration shape output part, and a variable definition part, wherein the variable definition part is configured to:

provide a variable list of the selected shape element; and receive variables including a length for each position, a position coordinate, an element start point, and an angle between elements of the shape which is selected by the user through the variable list, wherein the display unit is configured to provide a shape input screen displaying a process in which a shape is inputted, wherein the shape input screen includes a shape graphic output part, a shape information list, and a shape element selection part, wherein the shape graphic output part is configured to display a grid shape on the shape input screen in accordance with a size of a work piece, wherein the shape information list displays shape elements and is a user manipulable list, and wherein the user manipulable list includes a multi-dimensional list.

* * * * *